United States Patent
Britzger

(10) Patent No.: US 9,884,361 B2
(45) Date of Patent: Feb. 6, 2018

(54) METHOD FOR PRODUCING A SHAFT

(71) Applicant: Hirschvogel Umformtechnik GmbH, Denklingen (DE)

(72) Inventor: Hans-Juergen Britzger, Denklingen (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 33 days.

(21) Appl. No.: 14/721,294

(22) Filed: May 26, 2015

(65) Prior Publication Data
US 2015/0336163 A1 Nov. 26, 2015

(30) Foreign Application Priority Data
May 23, 2014 (DE) .................. 10 2014 209 869

(51) Int. Cl.
*F02B 75/06* (2006.01)
*B21K 1/08* (2006.01)
(Continued)

(52) U.S. Cl.
CPC .............. *B21K 1/08* (2013.01); *B21B 1/16* (2013.01); *B21D 7/00* (2013.01); *B21D 35/002* (2013.01); *B21J 1/06* (2013.01); *B21J 5/025* (2013.01); *B21K 1/063* (2013.01); *B21K 1/12* (2013.01); *F16C 3/02* (2013.01); *F16C 3/10* (2013.01); *F16C 33/581* (2013.01); *F16C 33/64* (2013.01); *F16F 15/264* (2013.01); *B23P 2700/07* (2013.01); *F16C 3/08* (2013.01); *F16C 19/466* (2013.01); *F16C 2361/53* (2013.01);
(Continued)

(58) Field of Classification Search
CPC ......... B21L 31/16; B21D 35/002; B21D 7/00; B21J 1/06; B21J 5/025; B21K 1/063; B21K 1/08; B21K 1/12; B23P 2700/07; F16C 3/10; F16F 15/264; F16F 2226/04
USPC ............ 123/192.1, 192.2; 74/573.1; 29/898, 29/898.04, 898.06
See application file for complete search history.

(56) References Cited

U.S. PATENT DOCUMENTS 1,486,587 A * 3/1924 Keeports ................. B21K 1/08
29/6.01
1,749,807 A * 3/1930 Ford ......................... F16C 3/20
74/603
(Continued)

FOREIGN PATENT DOCUMENTS

DE      10 2007 009 800 A1   10/2007
DE         102008008003 A1 *  8/2009  ............... F16C 3/02
(Continued)

*Primary Examiner* — Marguerite McMahon
*Assistant Examiner* — Tea Holbrook
(74) *Attorney, Agent, or Firm* — Muncy, Geissler, Olds & Lowe, P.C.

(57) ABSTRACT

A method for producing a shaft, in particular a balance shaft, crankshaft and the like, having at least one substantially annular bearing seat and at least one unbalance portion. The method includes the steps: provision of a shaft blank; formation of the at least one unbalance portion and of at least two opposite bearing seat side members by a forming process; and deformation of the at least two opposite bearing seat side members by a shell tool such that the bearing seat side members are bent together, whereby the at least one substantially annular bearing seat is formed.

19 Claims, 4 Drawing Sheets

(51) Int. Cl.
  *B21B 1/16* (2006.01)
  *B21J 5/02* (2006.01)
  *B21J 1/06* (2006.01)
  *B21D 7/00* (2006.01)
  *B21D 35/00* (2006.01)
  *F16C 3/10* (2006.01)
  *B21K 1/06* (2006.01)
  *B21K 1/12* (2006.01)
  *F16F 15/26* (2006.01)
  *F16C 3/02* (2006.01)
  *F16C 33/58* (2006.01)
  *F16C 33/64* (2006.01)
  *F16C 3/08* (2006.01)
  *F16C 19/46* (2006.01)

(52) U.S. Cl.
  CPC ..... *F16F 2226/04* (2013.01); *Y10T 29/49698* (2015.01); *Y10T 29/49828* (2015.01)

(56) References Cited

U.S. PATENT DOCUMENTS

| | | | | |
|---|---|---|---|---|
| 3,129,488 A * | 4/1964 | Robra | ............... | B21K 1/08 29/888.08 |
| 3,908,434 A * | 9/1975 | Ribback | ............... | B21J 7/14 72/400 |
| 5,791,309 A * | 8/1998 | Yamazaki | ............... | F01M 1/02 123/192.2 |
| 5,878,491 A * | 3/1999 | Morgen | ............... | B21J 5/02 29/888.09 |
| 6,854,358 B1 * | 2/2005 | Stuckler | ............... | F16F 15/264 123/192.2 |
| 8,327,542 B2 * | 12/2012 | Tisch | ............... | F16F 15/264 123/192.2 |
| 8,413,629 B2 | 4/2013 | Herzog et al. | | |
| 8,413,630 B2 | 4/2013 | Herzog et al. | | |
| 8,998,501 B2 * | 4/2015 | Dahlman | ............... | F16C 33/64 164/900 |
| 2009/0257702 A1 * | 10/2009 | Solfrank | ............... | F16C 3/02 384/585 |
| 2009/0272358 A1 * | 11/2009 | Schober | ............... | F16F 15/264 123/192.2 |
| 2009/0308343 A1 * | 12/2009 | Herzog | ............... | F16C 17/02 123/192.2 |
| 2010/0126457 A1 * | 5/2010 | Tisch | ............... | F16F 15/264 123/192.2 |
| 2011/0155106 A1 * | 6/2011 | von Mayenburg | ............... | F02D 15/02 123/48 B |
| 2011/0247581 A1 * | 10/2011 | Trieschmann | ............... | C22C 37/04 123/192.2 |
| 2012/0125281 A1 * | 5/2012 | Herzog | ............... | F16C 17/02 123/192.2 |
| 2013/0098175 A1 * | 4/2013 | Dahlman | ............... | B23K 11/04 73/865.8 |
| 2013/0139779 A1 * | 6/2013 | Bergmann | ............... | F02B 75/06 123/192.2 |
| 2013/0182988 A1 * | 7/2013 | Dahlman | ............... | B21D 53/10 384/569 |
| 2013/0213167 A1 * | 8/2013 | Dahlman | ............... | B21D 53/28 74/434 |
| 2013/0220070 A1 * | 8/2013 | Tisch | ............... | F16F 15/264 74/572.21 |
| 2014/0230969 A1 * | 8/2014 | Sugimoto | ............... | C22C 38/38 148/330 |
| 2015/0252900 A1 * | 9/2015 | Feistel | ............... | F16J 9/18 277/435 |

FOREIGN PATENT DOCUMENTS

| | | |
|---|---|---|
| DE | 20 2007 018 991 U1 | 2/2010 |
| DE | 10 2009 035 684 A1 | 2/2011 |
| DE | 10 2010 015 835 A1 | 10/2011 |

* cited by examiner

METHOD FOR PRODUCING A SHAFT

This nonprovisional application claims priority under 35 U.S.C. §119(a) to German Patent Application No. 10 2014 209 869.6, which was filed in Germany on May 23, 2014, and which is herein incorporated by reference.

BACKGROUND OF THE INVENTION

Field of the Invention

The present invention relates to a method for producing a shaft having at least one substantially annular bearing seat and at least one unbalance portion. The present invention further relates to a shaft of this type having at least one substantially annular bearing seat and at least one unbalance portion.

Description of the Background Art

In the prior art, a multiplicity of shafts having a variety of unbalance portions and bearing seats is known. In the automotive sector, in particular, such shafts are used as so-called balance shafts in internal combustion engines for the partial or full compensation of the free inertia forces. It is here known to provide the shaft with a bearing (in particular a roller or needle bearing) on the outer surface of the bearing seat and on the mutually opposite ends of the shaft. The shafts are here set in rotation in such a way that, as a result of the unbalance, at least a partial compensation of the free inertia forces is realized. Bearing seats of this type are usually provided on the shaft as solid disc-shaped or barrel-shaped components, on the outer surface of which a bearing is disposed. The unbalance portions, which are fixed relative to the bearing seat, here cause the main load to fall upon that side of the bearing seat which is facing the unbalance portions. In relation thereto, the loads on that side of the bearing seat which lies opposite the unbalance portions are comparatively low. Consequently, solidly configured bearing seats, at least in their load-free or low-load regions, are mechanically oversized. This ultimately leads to a higher consumption of resources and, in particular, to a higher fuel consumption of an internal combustion engine having such a shaft. In the light of this insight, shafts comprising solid bearing seats have been developed in the prior art, wherein, in the less loaded regions of the bearing seat, material has been removed or cut out in order to be able to appropriately reduce the weight of the bearing seat. Shafts of this type are disclosed, for instance, in printed publications DE 20 2007 018 991 U1 and DE 10 2009 035 684 A1, wherein material has there been removed there in the form of a circular arc, so that corresponding notches are obtained in the bearing seat. Bearing seats of this type have the drawback, however, that, for the arrangement of the bearing on the bearing seat, essentially a separate bearing ring has to be arranged on the bearing seat in order to be able to provide a continuous contact surface for the bearing.

Furthermore, efforts continue to be made to further reduce the weight of the known shafts, in particular of the bearing seat, in order thereby, on the one hand, to save on production material and, on the other hand, to reduce the fuel consumption of an internal combustion engine equipped therewith.

SUMMARY OF THE INVENTION

It is therefore an object of the present invention to provide a method with which a shaft having a bearing seat of reduced weight. In addition, a corresponding shaft is intended to be provided.

A method according to an embodiment of the invention for producing a shaft (for instance balance shaft, crankshaft and the like) having at least one substantially annular bearing seat and at least one unbalance portion can comprises at least the following steps: provision of a shaft blank; formation of the at least one unbalance portion and of at least two opposite bearing seat side members by via a forming process; deformation of the at least two opposite bearing seat side members via a shell tool such that the bearing seat side members are bent together, whereby the at least one substantially annular bearing seat is formed.

According to an embodiment of the invention, the bearing seat is thus provided such that firstly two opposite bearing seat side members are formed, so that the cross-sectional profile on the bearing seat is initially U-shaped. In a further step, the opposite bearing seat side members are bent together until a substantially annular, hollow bearing seat is obtained. In comparison to the known bearing seats, an annular, hollow bearing seat of this kind has a substantially lower weight. Furthermore, there is the possibility of forming a closed annular bearing seat, so that, in this exemplary embodiment, the need for a separate bearing ring is also eliminated. In addition, as a result of the annular, hollow bearing ring (whether open or closed)—in relation to the known methods—considerable savings can be made in terms of material, and thus also the production costs, which in turn leads to a reduction in the component weight and hence in the rotatory measurements, whereby (for instance in balance shafts of a vehicle) the fuel consumption can be lowered.

The shaft blank can be provided as a round billet having a dimensioning tailored to the shaft to be produced. Accordingly, the billet can have different diameters.

Prior to the step of forming the at least one unbalance portion and the at least two opposite bearing seat side members, a predeformation in the region of the at least one bearing seat and of the at least one unbalance portion can be realized by cross-rolling and/or roll forging. There is hence the possibility of, in one or more preforming steps, displacing material already into the regions at which, for the formation of the unbalance portions or for the formation of the bearing seat side members, material is correspondingly required.

The forming process for forming the at least one unbalance portion and the at least two opposite bearing seat side members can be a drop forging process. For the production of shafts, in particular of balance shafts, crankshafts and the like, a drop forging process is quite especially suitable, since the necessary high dimensional accuracy at high volumes can thereby be achieved. Since, with standard drop forging processes, essentially no undercuts can be produced, the method according to the invention constitutes a particularly advantageous option for producing an annular, hollow bearing seat by the use of a drop forging process, since, in the formation of the bearing seat side members, no such undercuts are provided.

The shaft blank, before and/or during the deformation and/or during the drop forging, can be heated inductively. In addition, after the drop forging and/or after the deformation of the at least two opposite bearing seat side members, excess material can be (mechanically) removed, for example, trimmed.

Advantageously, the deformation, i.e. the bending together, of the at least two opposite bearing seat side members can be realized in a hot, warm or cold deforming step.

Advantageously, the bearing seat side members are bent together in such a way that end faces of the bearing seat side members can be brought into contact with each other and thus a closed bearing seat can be formed. Advantageously, those end faces of the bearing seat side members which have been brought into contact with each other are subsequently welded together. Through the welding together of the two bearing seat side members, the dimensional stability of the bearing seat, insofar as is necessary for later use, can be appropriately increased.

Alternatively to the end faces of the bearing seat side members being brought into a contact with each other (and the accompanying formation of a closed annular bearing seat), the bearing seat side members can be bent together in such a way that an open bearing seat is formed (i.e. the annular bearing seat is not closed, but is partially open on the side opposite the unbalance(s)). The annular bearing seat can be open over an angular range between 5° and 45°, further preferably between 10° and 30°, and particularly preferably between 15° and 20°. Depending on the use of the shaft, some such open design of the bearing seat can be sufficient to ensure the necessary dimensional stability of the bearing seat.

A latch, which can be brought into mutual engagement and are interlocked, are provided on the bearing seat side members. Such latch can be provided, for instance, by corresponding projections and undercuts, in particular on the end faces of the bearing seat side members. For instance, on one end face could be provided a peg-like tongue, which can be brought into engagement with an appropriately configured groove. There is hence the possibility of, where necessary, further increasing the dimensional stability of an annular bearing seat.

In addition, it can be advantageous—in particular in an embodiment having an open bearing seat, or when the brought-together end faces of the bearing seat side members are in loose contact—if at least one fixing device, for example, a bearing ring, is arranged on the bearing seat, wherein the fixing device can be applied to the bearing seat by shrinkage fit. This too constitutes a measure for being able to increase the dimensional stability and functionality (for instance, in an open bearing seat) of the annular bearing seat, in particular insofar as this is demanded by the respective applications.

In an example, after formation of the bearing seat, the bearing seat, at least in sections, can be hardened, wherein, in particular, an inductive hardening process is used. In this respect, it is advantageous that a steel alloy, containing a carbon component necessary for inductive hardening, is used for the production of the shaft. In addition, other final machining steps, such as, for instance, grinding and finishing, are also conceivable. The shaft can be configured as an integral component.

The annular bearing seat can have a wall thickness between 2 and 15 mm, preferably between 4 and 10 mm, and particularly preferably between 5 and 8 mm, wherein the wall thickness of the bearing seat can be variable over the periphery. The diameter of the bearing seat is preferably between 15 and 150 mm, further preferably between 20 and 100 mm, and particularly preferably between 25 and 40 mm.

The present invention additionally relates to a shaft which has been produced according to a method described above.

The present invention further relates to a shaft, in particular a balance shaft, crankshaft and the like, having at least one substantially annular bearing seat and at least one unbalance portion. As already stated above, the bearing seat can be a closed bearing seat, wherein the bearing seat side members can be welded together. Alternatively, the bearing seat can be configured as an open bearing seat, wherein the bearing seat can be open over an angular range between 5° and 45°, further preferably between 10° and 30°, and particularly preferably between 15° and 20°. The wall thickness of the bearing seat is here likewise preferably between 2 and 15 mm, further preferably between 4 and 10 mm, and particularly preferably between 5 and 8 mm, wherein the bearing seat advantageously has different wall thicknesses over its periphery. The diameter of the bearing seat can be between 15 and 150 mm, further preferably between 20 and 100 mm, and particularly preferably between 25 and 40 mm. Further, the shaft can be configured as an integral component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
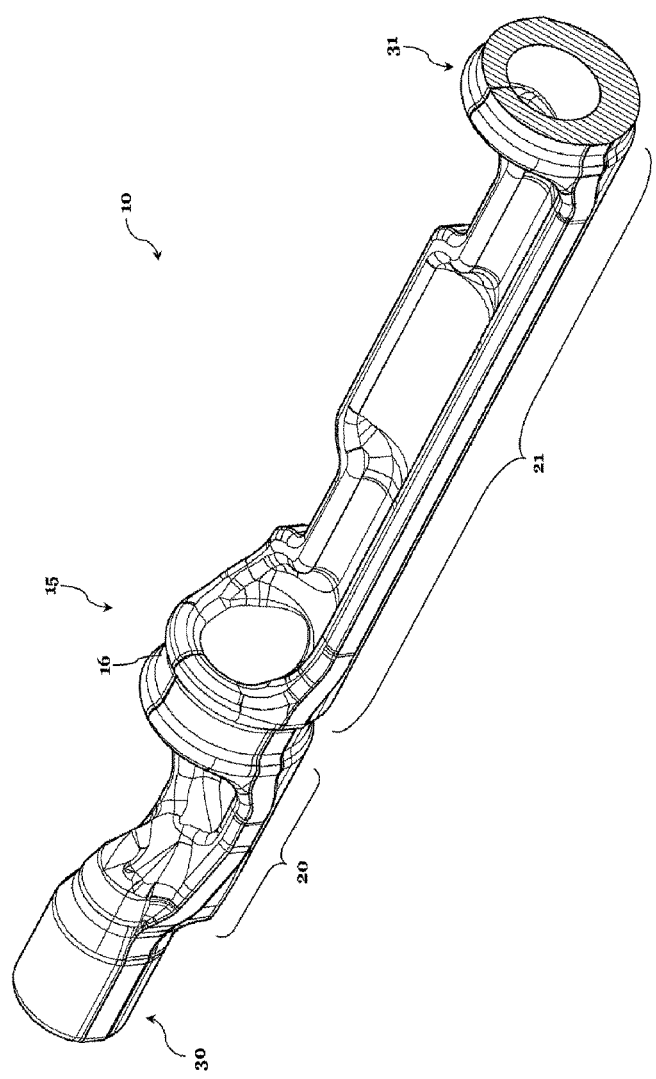
FIG. 1 shows a schematic view of an exemplary embodiment of a shaft according to the invention.

FIG. 1 shows an exemplary illustrative embodiment of a shaft 10 according to an embodiment of the invention, which has an annular bearing seat 15 and unbalance portions 20, 21 arranged to the side thereof—i.e. viewed in the axial direction.

The shaft 10 according to the invention can be used as a balance shaft in an internal combustion engine for the partial or full compensation of the free inertia forces and/or of the moments of inertia. A radial mounting of the shaft 10 can be realized via low-friction needle or roller bearings (not shown). These are disposed on a circumferential contact surface 16 of the annular bearing seat 15 or on corresponding surfaces on contact surfaces located at mutually opposite ends 30, 31 of the shaft 10. Instead of balance shafts, any other known types of shafts which have bearing seats and unbalances (i.e. a mass distributed in a non-rotationally-symmetrical manner in at least one section of the shaft; irrespective of whether the centre of gravity of the shaft lies on the rotational axis thereof, or not), such as, for instance, crankshafts, camshafts and the like, are also conceivable.

In the shown illustrative embodiment, similarly one of the bearing ends 31 is configured as a bearing seat according to the invention. Additionally or alternatively, the other bearing end 30 or further middle bearing seats could similarly also be configured according to the invention. Nor is the number, position and dimensions of the bearing seats and unbalance portions limited by the invention. For the sake of simplicity, for the description of the invention reference is below confined to the middle bearing seat 15, though the same can also apply to all other bearing seats.

As can be clearly seen in FIG. 1, the annular bearing seat 15 of the shaft 10 is configured as a closed, hollow ring. Since the forces which arise during operation are not generated in a radially symmetrical manner on the shaft 10, but, as a result of the asymmetrical weight distribution due to the unbalance portions 20, 21, are generated in a correspondingly asymmetrical manner, there is essentially also the possibility of making the bearing seat 15 open, to be precise on the side lying radially opposite the unbalances of the unbalance portions 20, 21. Insofar, therefore, as the dimensional stability of the shaft 10 is ensured due to the generated forces, the weight of the shaft 10 can be reduced still further by virtue of an open bearing seat.

Depending on the application, the wall thickness of the annular bearing seat 15 is between 2 and 15 mm, preferably between 4 and 10 mm, and particularly preferably between 5 and 8 mm. The wall thickness of the bearing seat 15, viewed over the periphery, can also be configured with different magnitude. The diameter of the bearing seat 15 (i.e. the outer diameter of the annular bearing seat 15 up to the contact surface 16) measures between 15 and 150 mm, preferably between 20 and 100 mm, and particularly preferably between 25 and 40 mm.

As can further be seen in FIG. 1, the annular bearing seat 15 can be provided with beads provided on the side of the contact surface 16 in order to preclude lateral sliding off or an oblique arrangement of the bearings on the contact surface 16.

Depending on the field of application, there is the possibility, furthermore, of arranging a fixing device on the bearing seat 15 (in particular on the contact surface 16) in order to possibly increase the dimensional stability or functionality (for instance, possibly with open bearing seat 15) of the bearing seat 15. Fixing device of this type can be, for example, bearing rings disposed on the contact surface 16, which bearing rings, for instance, can be shrunk onto or drawn onto the contact surface 16.

The shaft 10 shown in FIG. 1 is here configured as an integral component, which can be produced from a steel alloy suitable for use in a drop forging process. It is here particularly advantageous that the used steel alloy has a carbon content which is suitable for hardening the shaft or sections thereof (in particular the region of the bearing seat 15) by an inductive hardening process.

Figure 2:
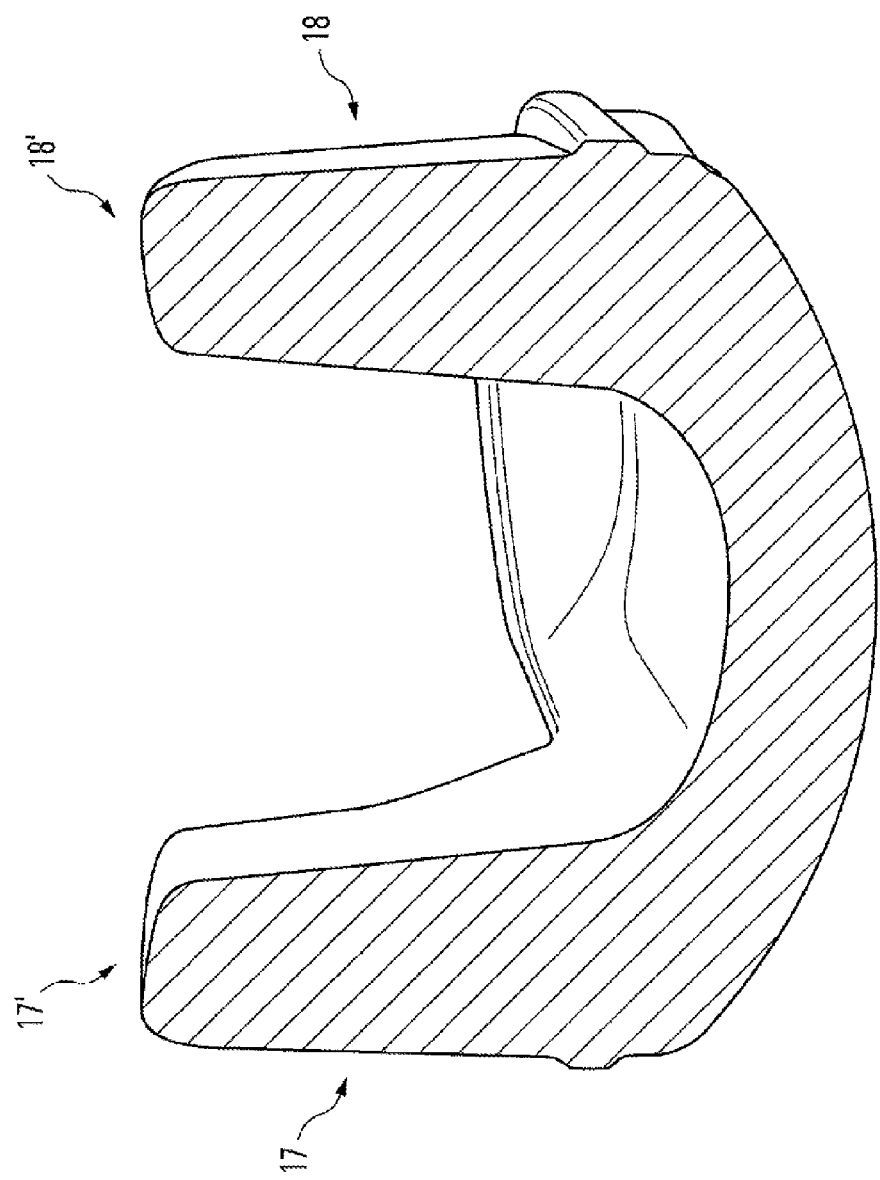
FIG. 2 shows a schematic cross-sectional view of a shaft according to the invention in the region of two opposite bearing seat side members prior to the deformation.

An embodiment of a method according to the invention for producing the shaft 10 shown in FIG. 1 is defined below with reference to FIGS. 2 to 4.

In a first method step, a shaft blank (not shown) is provided as a round billet. The shaft blank can have different diameters.

After this, at least the unbalance portions 20, 21 and, in the region of the bearing seat 15, at least two opposite bearing seat side members 17, 18 are formed via a forming process. As can be seen in FIG. 2, in the region of the later bearing seat 15 a type of U-shaped cross-sectional profile is thus firstly provided. Here, as the exemplary forming process for the formation of the unbalance portions 20, 21 and of the two opposite bearing seat side members 17, 18 shown in FIG. 2, a drop forging process is used.

Prior to the formation of the unbalance portions 20, 21 and of the two opposite bearing seat side members 17, 18, a predeformation can be performed in these regions, in particular in order to reduce the forces generated in the drop forging process, wherein, for the predeformation of these regions, a cross-rolling and/or roll forging process is preferably used. As a result of this process, the shaft blank is "kneaded", so to speak, in such a way as to displace material into the regions of the later bearing seats 15 or bearing seat side members 17, 18 and unbalances 10, 21.

Figure 3:
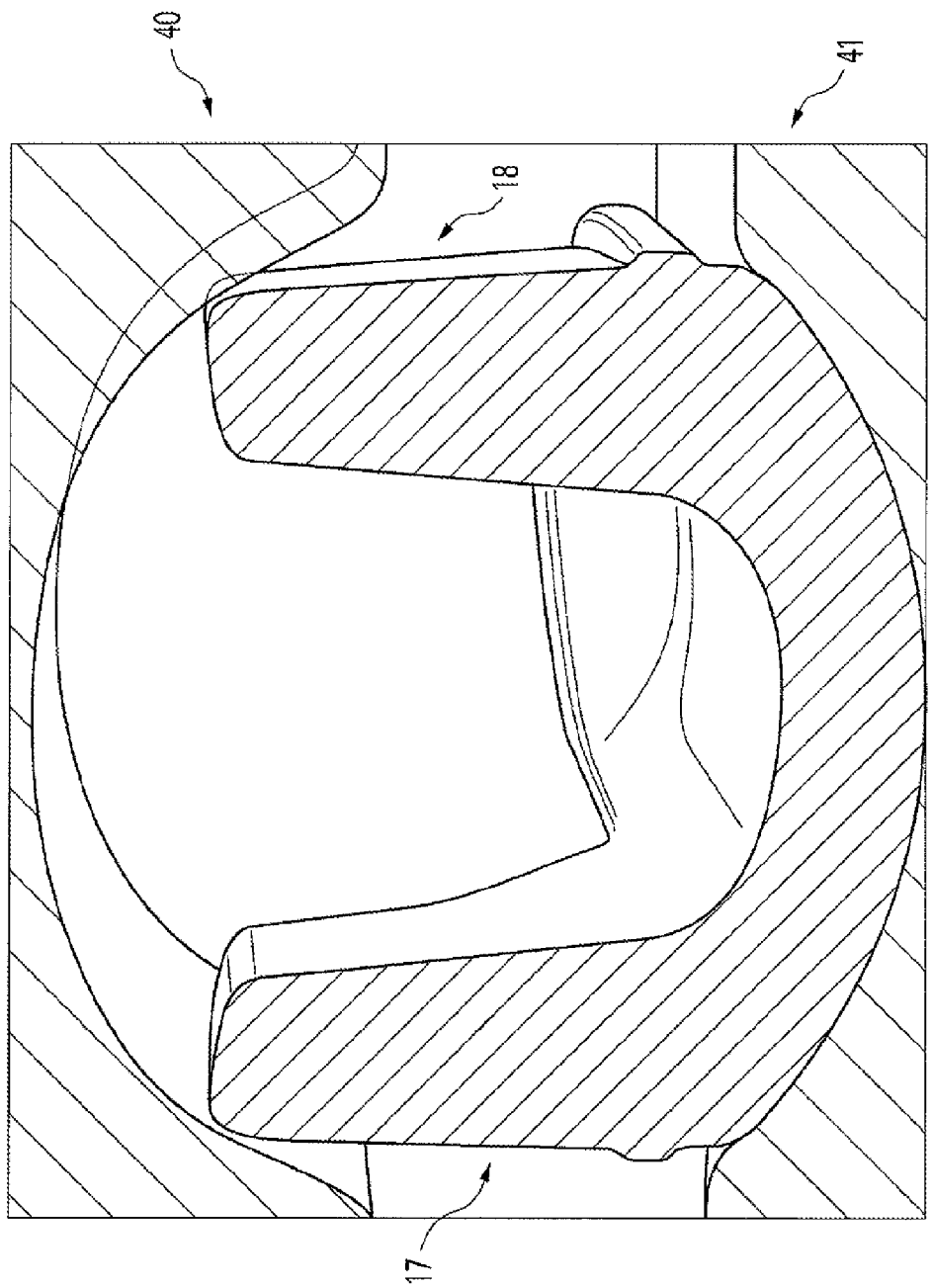
FIG. 3 shows the opposite bearing seat side members shown in FIG. 2, which are in engagement with a shell tool.
Figure 4:
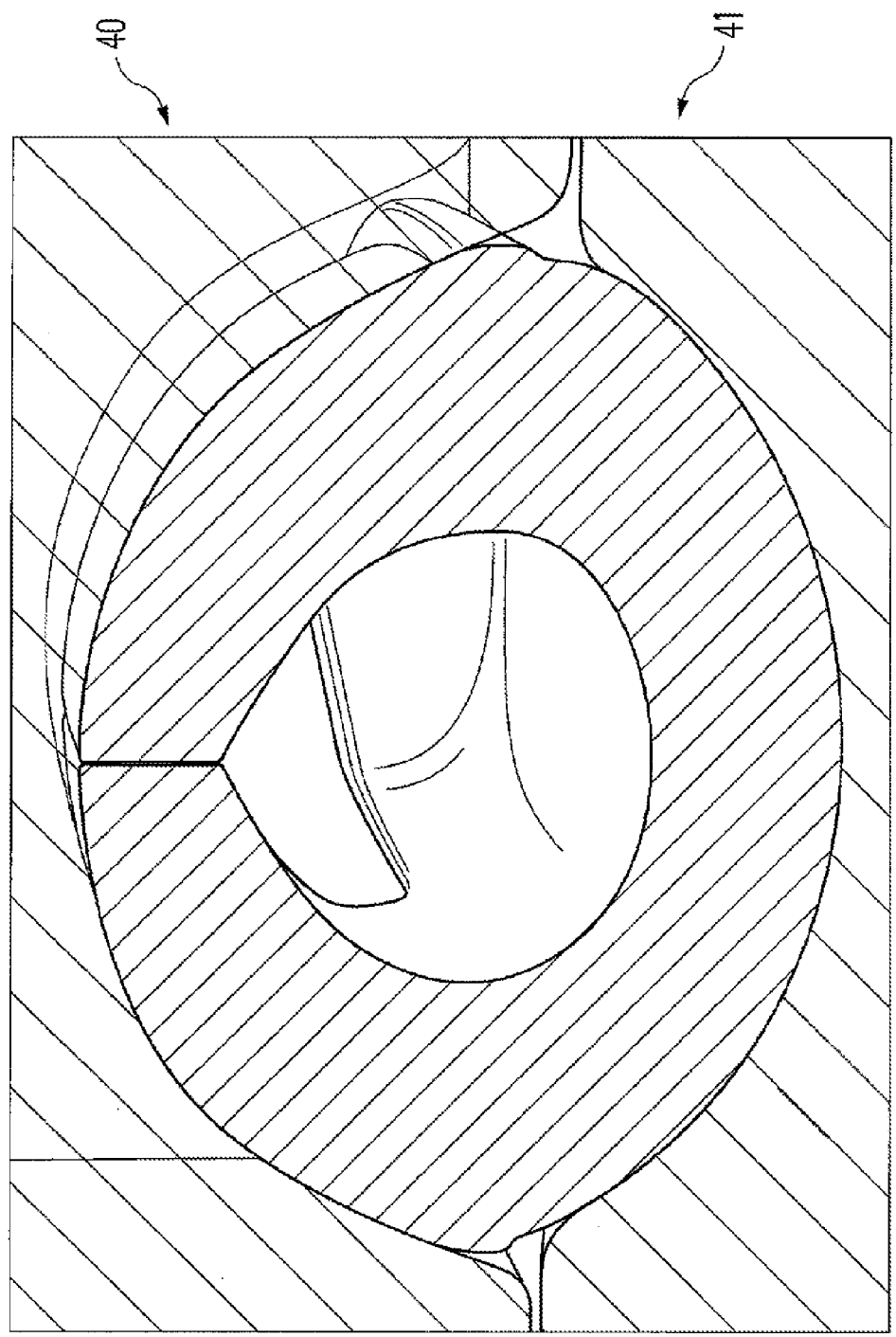
FIG. 4 shows an annular, closed bearing seat after the forming by the shell tool.

After the step of forming the two opposite bearing seat side members 17, 18, the bearing seat side members 17, 18 are bent together in such a way via a shell tool 40, 41 shown by way of example in FIG. 3 that the annular bearing seat 15 shown in FIG. 4 is thereby formed. In the exemplary embodiment, the bearing seat side members 17, 18 are here bent together in such a way by the shell tool 40, 41 that end faces 17', 18' (cf. FIG. 2) of the bearing seat side members 17, 18 are brought into contact with each other, whereby the shown closed annular bearing seat 15 is formed. In the shown exemplary embodiment, the bearing seat side members 17, 18 are welded together in the region of their end faces 17', 18' in order thereby to increase the dimensional stability of the bearing seat 15. The deformation of the two opposite bearing seat side members 17, 18 can here be realized in a hot, warm or cold deforming step.

Alternatively or additionally to the above-stated welding of the bearing seat side members 17, 18, there is the possibility of providing on the bearing seat side members 17, 18 (possibly on their respective end faces 17', 18') a latching (not shown), which, when the bearing seat side members 17, 18 are bent together, can be brought into mutual engagement and possibly interlocked. For instance, the latching of this type can be provided as tongue and a groove, which can be brought into non-positive and/or positive engagement with each other by the bending together of the bearing seat side members 17, 18.

During the deformation and/or during the drop forging, the shaft blank can be heated inductively. In addition, after the drop forging and/or after the deformation of the at least two opposite bearing seat side members 17, 18, a trimming step, with which excess material can be trimmed, is realized. After formation of the bearing seat 15, at least the bearing seat 15 or sections of the bearing seat 15 can be hardened, wherein, an inductive hardening process is used. Other final machining steps or processes, such as grinding and finishing, are also conceivable.

With the method according to the invention, a shaft 10, which has an annular, hollow bearing seat 15, can thus be produced. In comparison to the previously known bearing seats, the annular bearing seat 15 here has considerably less material or weight, so that, on the one hand, the total weight of the shaft 10 and, on the other hand, in particular the weight of the bearing seat 15, and thus also the weight of the unbalance regions 20, 21, can be considerably reduced. Furthermore, in the exemplary embodiment of the shaft 10, having a closed bearing seat 15, a separate bearing ring can be dispensed with, since the bearing seat 15 already provides a closed contact surface 16.

The present invention is not limited to the preceding illustrative embodiment, but embraces all embodiments covered by the scope of protection of the following claims.

For instance, the invention is not limited to the number of bearing seats, nor, in particular, to the number of these bearing seats which are formed according to the invention. Moreover, it is conceivable that different embodiments of bearing seats (for instance open/closed ring), combined on a single shaft, can be present. Nor is the invention limited to certain dimensions of the shaft, unbalances, bearing seats and wall thicknesses of these same.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a shaft having at least one substantially annular bearing seat and at least one unbalance portion, the method comprising:
   providing a shaft blank;
   forming the at least one unbalance portion and forming at least two opposite bearing seat side members via a forming process; and
   deforming the at least two opposite bearing seat side members via a shell tool such that the bearing seat side members are bent together such that the at least one substantially annular bearing seat is formed.

2. The method according to claim 1, wherein, prior to the step of forming the at least one unbalance portion and the at least two opposite bearing seat side members, a predeformation in the region of the at least one bearing seat and of the at least one unbalance portion is realized by cross-rolling and/or roll forging.

3. The method according to claim 1, wherein the forming process for forming the at least one unbalance portion and the at least two opposite bearing seat side members is a drop forging process.

4. The method according to claim 1, wherein the shaft blank is provided as a round billet, which has different diameters.

5. The method according to claim 1, wherein the shaft blank, before and/or during the deformation and/or drop forging, is heated inductively.

6. The method according to claim 1, wherein, after a drop forging and/or after the deformation of the at least two opposite bearing seat side members, excess material is trimmed.

7. The method according to claim 6, wherein the end faces of the bearing seat side members that have been brought into contact with each other are welded together.

8. The method according to claim 1, wherein the deformation of the at least two opposite bearing seat side members is realized in a hot, warm or cold deforming step.

9. The method according to claim 1, wherein the bearing seat side members are bent together in such a way that end faces of the bearing seat side members are brought into contact with each other and a closed bearing seat is formed.

10. The method according to claim 1, wherein the bearing seat side members are bent together in such a way that an open bearing seat is formed, wherein the bearing seat is open over an angular range between 5° and 45°, between 10° and 30°, or between 15° and 20°.

11. The method according to claim 1, wherein after formation of the bearing seat, the bearing seat, at least in sections, is hardened, and is final machined via an inductive hardening process and/or via further other processes including grinding and finishing.

12. The method according to claim 1, wherein the bearing seat has a wall thickness between 2 and 15 mm, between 4 and 10 mm, or between 5 and 8 mm.

13. The method according to claim 1, wherein the bearing seat has a different wall thicknesses over its periphery.

14. The method according to claim 1, wherein a diameter of the bearing seat measures between 15 and 150 mm, between 20 and 100 mm, or between 25 and 40 mm.

15. A shaft produced according to a method according to claim 1.

16. A shaft produced according to claim 1, wherein the shaft is a balance shaft or crankshaft having at least one substantially annular bearing seat and at least one unbalance portion.

17. The shaft according to claim 16, wherein the bearing seat is a closed bearing seat and the bearing seat side members are welded together.

18. The shaft according to claim 16, wherein the bearing seat is an open bearing seat, and wherein the bearing seat is open over an angular range between 45° and 5°, between 30° and 10°, or between 20° and 15°.

19. The shaft according to claim 16, wherein the shaft is configured as an integral component.

* * * * *